(12) United States Patent
Kawatani

(10) Patent No.: US 7,392,175 B2
(45) Date of Patent: Jun. 24, 2008

(54) EVALUATING COMMONALITY OF DOCUMENTS USING SEGMENT VECTOR, CO-OCCURRENCE MATRIX, AND COMMON CO-OCCURRENCE MATRIX

(75) Inventor: Takahiko Kawatani, Yokohama Kanagawa (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1021 days.

(21) Appl. No.: 10/694,773

(22) Filed: Oct. 29, 2003

(65) Prior Publication Data

US 2004/0093557 A1 May 13, 2004

(30) Foreign Application Priority Data

Nov. 8, 2002 (JP) ............... 2002-326157

(51) Int. Cl.
G06F 17/27 (2006.01)
G06F 17/28 (2006.01)
G06F 17/30 (2006.01)

(52) U.S. Cl. ............... 704/9; 704/257; 707/102
(58) Field of Classification Search ............ 704/9, 704/257; 707/102
See application file for complete search history.

(56) References Cited

U.S. PATENT DOCUMENTS

| | | | |
|---|---|---|---|
| 5,675,819 A * | 10/1997 | Schuetze | 704/10 |
| 5,787,422 A * | 7/1998 | Tukey et al. | 707/5 |
| 6,356,864 B1 * | 3/2002 | Foltz et al. | 704/1 |
| 7,130,848 B2 | 10/2006 | Oosta | |
| 2005/0022106 A1 | 1/2005 | Kawai et al. | |

OTHER PUBLICATIONS

C.D Manning and H. Schutze. *Foundations of Statistical Natural Language Processing. The MIT Press*, 1999.Chapter 14 p. 495-528 and Chapter 8.5 (p. 294-308).
H. Zha. Generic Summarization and Keyphrase Extraction Using Mutual Reinforcement Principle and Sentence Clustering. *In Proceedings of the 25th Annual International ACM-SIGIR Conference on Research and Development in Information Retrieval*, pp. 113-120. Tampere, Finland, Aug. 2002.
H. Hardy, N. Shimizu, T.Strzalkowski, L. Ting, G.B Wise and X. Zhang. Cross-Document Summarization by Concept Classification. *In Proceedings of the 25th Annual International ACM-SIGIR Conference on Research and Development in Information Retrieval*, pp. 121-128. Tampere, Finland, Aug. 2002.

* cited by examiner

*Primary Examiner*—David R. Hudspeth
*Assistant Examiner*—Abdelali Serrou

(57) ABSTRACT

In evaluating commonality of documents, each sentence is represented by a binary vector whose components indicate the presence or absence of corresponding terms, whereupon the concept of a common vector among documents is introduced. One sentence vector is derived from each of the documents to form a group of sentence groups, and only components which assume "1" (one) in all the vectors are "1", the other components being "0" (zero). The commonality of a document set is evaluated by employing the sum or squared sum of the numbers of components whose values are not zero in the individual common vectors, for all the common vectors.

33 Claims, 3 Drawing Sheets

EVALUATING COMMONALITY OF DOCUMENTS USING SEGMENT VECTOR, CO-OCCURRENCE MATRIX, AND COMMON CO-OCCURRENCE MATRIX

CROSS-REFERENCE TO RELATED APPLICATIONS AND CLAIM OF PRIORITY

The present application is based on Japanese Application No. 2002-326157, filed in Japan on Nov. 8, 2002 and priority thereof is hereby claimed under 35 U.S.C. 119.

BACKGROUND OF THE INVENTION

1. Field of the Invention

The present invention relates to natural language processing which includes document summarization. More particularly, the present invention makes possible to quantitatively evaluate the commonality of topics among a large number of documents, thereby enhancing the processing performance.

2. Description of the Related Art

When a document set consisting of a plurality of documents is provided, the quantitative evaluation of a topical commonality for the document set necessitates the following techniques:

(A) The degrees to which the topics of the individual documents are common are indicated by numerical values so that whether or not a common topic exists in the document set can be judged.

(B) The individual documents or individual sentences are scored in accordance with the degrees of closeness to a common topic so that the documents or sentences containing topics close to the common topic can be selected from within the document set, to thereby discern the common topics among all the documents.

(C) Even when a topic is not common to all the documents, any group of documents whose topics are common is extracted.

Regarding item (A) of these techniques, in the case of two documents, the score of the commonality of topics can be considered to be the similarity between the two documents, and various measures for the similarity have heretofore been proposed. The most typical measure is the cosine similarity, wherein each document is represented by a vector whose components are the frequencies of individual terms occurring in the document, whereupon the similarity between the two documents is defined by a cosine formed by the vectors of the respective documents.

Items (B) and (C) are techniques which pertain to the extraction of common topics from within a document set. Such processing is important in multi-document summarization, TDT (Topic Detection and Tracking), etc. Heretofore, the extraction of the common topics has been implemented by clustering documents and thereafter selecting sentences or document titles that can typify the respective clusters. Recently, there has also been proposed a method in which common topics are extracted by forming clusters in sentence or passage units and selecting the important passages of the respective clusters. Clustering has heretofore been a technique that is indispensable to the extraction of the common topics. This clustering is broadly classified into a hierarchical technique and a non-hierarchical technique.

The hierarchical technique is subclassified into a bottom-up approach and a top-down approach. In the bottom-up approach, individual documents are set as the seeds of clusters as an initial state, followed by merging the closest clusters, and the process is iterated until the number of clusters becomes equal to 1 (one). Thus, a document set comes to be represented by a tree structure. The top-down approach iterates a process that starts from a state where all documents belong to a single cluster, and in which, when the lowest similarity in all document pairs within the single cluster is less than a threshold, the cluster is divided. In the non-hierarchical technique, a predesignated number of clusters is created so as to satisfy any criterion. A well-known method includes step 1 at which documents in the designated number of clusters are selected at random and are set as the centers of the respective clusters, step 2 at which the degrees of closeness to the respective cluster centers are evaluated for every document, whereupon the respective documents are caused to belong to the closest clusters, step 3 at which the center of each of the resulting clusters is found on the basis of the average of the vectors of the documents belonging to the corresponding cluster, and step 4 at which the processing of the step 2 is executed, and the routine is ended if the clusters to which the respective documents belong have not changed, or the routine is returned to the step 3 if they have changed.

Regarding the technique (A), as stated above, any measure corresponding to the similarity in the case of the two documents has not been known for a case of three or more documents. Therefore, when a group of three documents stating similar topics coexists with a group of four such documents, it has been impossible to answer a question; "Which of the groups have the closest content matches?" The present invention provides a measure that can answer even such a question.

In the extraction of the common topics in the techniques (B) and (C), the bottom-up hierarchical clustering process cannot guarantee that the clusters at each level is meaningful. In aiming at meaningful grouping, only each pair of clusters whose similarities exceed a threshold can be merged, but how to determine the threshold is problematic. Also in the case of the top-down hierarchical clustering process, how to determine the threshold for whether or not the cluster is divided is problematic. Moreover, the problem of a processing complexity cannot be overlooked in the hierarchical technique. In the non-hierarchical technique, it is required to previously know how many clusters a given document set includes. However, the previous knowledge is information that is generally unobtainable, and it is difficult to accurately designate the number of clusters. In this manner, the clustering technique itself has not been completely established. Accordingly, even when the extraction of the common topics has been implemented using the prior-art clustering technique, it is not guaranteed to be optimal. For such reasons, the present invention provides a common-topic extraction method that does not resort to the prior-art clustering technique.

SUMMARY OF THE INVENTION

In the present invention, solving the problems concerning technique (A) include evaluating the quantity of common information between or among documents, and subsequently normalizing the evaluated quantity of common information so as not to depend upon the lengths of the documents and the number of the documents. Accordingly, how to define the quantity of common information between or among the documents and how to evaluate it become important, and they are handled as stated below in the present invention. First, assuming that there are two sentences, it is considered that the quantity of common information between the two sentences is determined by the number of common terms. When one sentence is extracted from each of the respective documents so as to combine the extracted sentences, the quantity of common information between the two documents is determined by the sum or squared sum of the numbers of common terms in all the pairs of such combined sentences. In this case, the number of combinations of the extracted sentences is equal to the product of the numbers of sentences in the respective documents. Also in case of three or more documents, all the combinations of sentences among the documents are considered. In order to facilitate the calculation of the numbers of common terms in such combined sentences, each sentence is represented by a binary vector whose components represent the presence or absence of corresponding terms, whereupon each document is represented by a set of such sentence vectors. The concept of a common vector is introduced for the combination of two or more sentence vectors. Letting $c=(c_n)$ denote the common vector of the two sentence vectors $a=(a_n)$ and $b=(b_n)$, the components of the common vector are obtained as $c_n=a_n \times b_n$ because the sentence vectors are binary in the present invention. By way of example, the common vector of sentence vectors (0, 1, 1, 0) and (1, 1, 0, 1) is (0, 1, 0, 0). The components of the common vector of three or more vectors are the products between the corresponding components.

As a simple example, consider documents $D_1$, $D_2$ and $D_3$ in each of which six terms occur and which are respectively composed of four, three and three sentences.

TABLE 1

| Document | Sentence | Sentence vector component | | | | | |
|---|---|---|---|---|---|---|---|
| $D_1$ | $D_{11}$ | 0 | 1 | 1 | 0 | 1 | 1 |
|  | $D_{12}$ | 1 | 1 | 0 | 0 | 0 | 1 |
|  | $D_{13}$ | 1 | 1 | 0 | 0 | 1 | 1 |
|  | $D_{14}$ | 1 | 0 | 1 | 0 | 1 | 0 |
| $D_2$ | $D_{21}$ | 0 | 0 | 1 | 1 | 0 | 1 |
|  | $D_{22}$ | 1 | 0 | 1 | 0 | 1 | 1 |
|  | $D_{23}$ | 0 | 0 | 0 | 1 | 1 | 0 |
| $D_3$ | $D_{31}$ | 1 | 0 | 1 | 1 | 1 | 1 |
|  | $D_{32}$ | 0 | 1 | 1 | 1 | 0 | 0 |
|  | $D_{33}$ | 1 | 0 | 0 | 1 | 1 | 1 |

The yth sentence of the document $D_r$ (r=1, 2 or 3) is now denoted by $D_{ry}$. Table 1 exemplifies the sentence vectors of such documents $D_1$, $D_2$ and $D_3$. While the number of combinations of the sentences of the documents $D_1$, $D_2$ and $D_3$ in Table 1 that exist is equal to: 4×3×3=36, Table 2 lists common vectors and the numbers of common terms as to 6 of the 36 combinations.

TABLE 2

| Combined Sentence | Common vector component | | | | | | Number of common terms |
|---|---|---|---|---|---|---|---|
| $D_{11} D_{21} D_{31}$ | 0 | 0 | 1 | 0 | 0 | 1 | 2 |
| $D_{11} D_{21} D_{32}$ | 0 | 0 | 1 | 0 | 0 | 0 | 1 |
| $D_{11} D_{21} D_{33}$ | 0 | 0 | 0 | 0 | 0 | 1 | 1 |
| $D_{11} D_{22} D_{31}$ | 0 | 0 | 1 | 0 | 1 | 1 | 3 |
| $D_{11} D_{22} D_{32}$ | 0 | 0 | 1 | 0 | 0 | 0 | 1 |
| $D_{11} D_{22} D_{33}$ | 0 | 0 | 0 | 0 | 1 | 1 | 2 |
| . | | . | | | . | | . |
| . | | . | | | . | | . |
| . | | . | | | . | | . |

In case of the combination of sentences $D_{11}$, $D_{21}$ and $D_{31}$, sentence vector components which are "1" in all three documents are the 3rd and 6th components, and the common vector becomes a vector in which only the 3rd and 6th components have the value "1". The number of common terms of the sentences $D_{11}$, $D_{21}$ and $D_{31}$ is the number of components having the value "1" in the common vector, that is, equal to 2. In the case of the combination of sentences $D_{11}$, $D_{21}$ and $D_{32}$, the common vector has the value "1" at only the 3rd component, and the number of common terms is equal to 1. The quantity of common information of the documents $D_1$, $D_2$ and $D_3$ is the sum or squared sum of the numbers of common terms in the respective sentence combinations numbering 36.

According to an aspect of the present invention, the concept of the co-occurrence matrix of the common vectors is used in order to facilitate the calculation of the sum or squared sum of the numbers of common terms. Letting $S^C$ denote the co-occurrence matrix of the common vectors, the component $S^C_{mn}$ thereof is found by evaluating the product between the mth component and nth component of each of the common vectors and then totaling the values of such products for all the common vectors. In the above example, the co-occurrence matrix $S^C$ is derived using the 36 common vectors. When the co-occurrence matrix of the common vectors is employed, the sum of the numbers of common terms is given by the sum of the diagonal components of the co-occurrence matrix of the common vectors, and the squared sum of the numbers of common terms is given by the sum of all the components of the co-occurrence matrix of the common vectors. Accordingly, how to efficiently derive the co-occurrence matrix of the common vectors becomes important. In this regard, the present invention provides a new and improved method of deriving the co-occurrence matrix without obtaining the common vectors.

Two approaches to be stated below can be used for solving the problems in the technique (B). One approach, in a case where a document or sentence to be handled is added to an original document set, is to thereby create a new document set, and where the quantity of common information in the new document set is evaluated, the value of the quantity of common information will become smaller for the document or sentence which is not close to the common topic of the original document set. The other approach, in a case where a similarity is evaluated between a document or sentence to be handled and a common vector set derived from an original document set, is that the document or sentence of higher similarity is closer to the common topic of the original document set.

The technique (C) is directed toward a case where a topic is not common to all documents, but where a commonality exists in some of the documents. An approach for solving the problems in the technique (C) is as stated below. In the above description, each common vector is given the value "1" at only the components at which all the documents are the value "1" in the group of combined sentence vectors. It is a common vector of, so to speak, "all-document match type". In contrast, when a specified component is noticed, the value "1" is assigned to the specified component of a common vector on condition that the number of sentence vectors in each of which the corresponding component has the value "1" exceeds a certain threshold. This common vector is to be called a common vector of "mismatch allowance type". When either of the approaches of the technique (B) is adopted using a set of common vectors thus obtained, the degrees of closeness of individual documents or sentences to the common topic existing in some of the documents can be evaluated by setting the threshold at an appropriate value.

As described above, according to another aspect of the present invention, scores can indicate the degrees to which the topics of a plurality of documents are common, and this serves as an important basic technique for the analysis of the topical commonality of the documents. Moreover, even when topics do not match in all documents, one can execute a series of processing steps; (1) extracting any documents having the same topic, from among all of the documents, (2) evaluating the scores of the degrees of topical commonality of the extracted documents, and (3) extracting a sentence closest to the common topic so that the topic common to the extracted documents can be directly known to a user. The present invention adopts the new concept of the common vectors among the sentences of the individual documents forming the basis of the analysis, resulting in more appropriate results than in the prior art.

DETAILED DESCRIPTION

Figure 1:
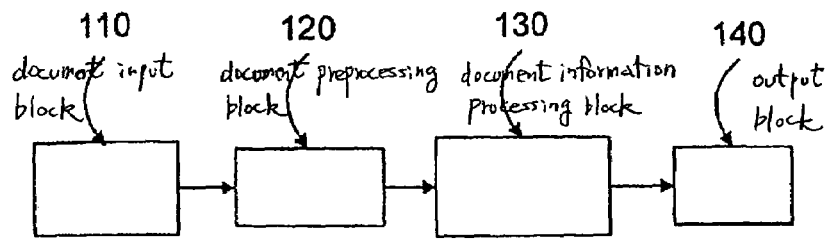
FIG. 1 is a block diagram of elements arranged to perform certain aspects of the present invention.

FIG. 1 is a block diagram of a document similarity of valuation system including document input block 110, a document preprocessing block 120, a document information processing block 130, and an output block 140. A document, a sentence, a document segment, etc., to be processed is inputted to the document input block 110. In the document preprocessing block 120, the inputted document is subjected to term detection, morphological analysis, document segmentation, etc. A document segment is an element that constitutes a document, and the most fundamental unit of a document is a sentence. In case of English writing, the sentence can be easily extracted because it ends in a period, followed by a space. Other document segmentation methods include: a method wherein, a complex sentence is separated into a principal clause and a subordinate clause beforehand; a method wherein a plurality of sentences are collectively divided into document segments so as to have a substantially equal number of terms; a method wherein a document is divided into segments having the same number of terms, from the head thereof and irrespective of sentences, etc. The document information processing block 130 executes information processing as will be explained in detail below, so as to evaluate a document set commonality, a document—document set commonality and a document segment—document set commonality and to extract documents and document segments close to a common topic. The output block 140 delivers the results obtained by the document information processing block 130 to an output device, such as display.

Figure 3:
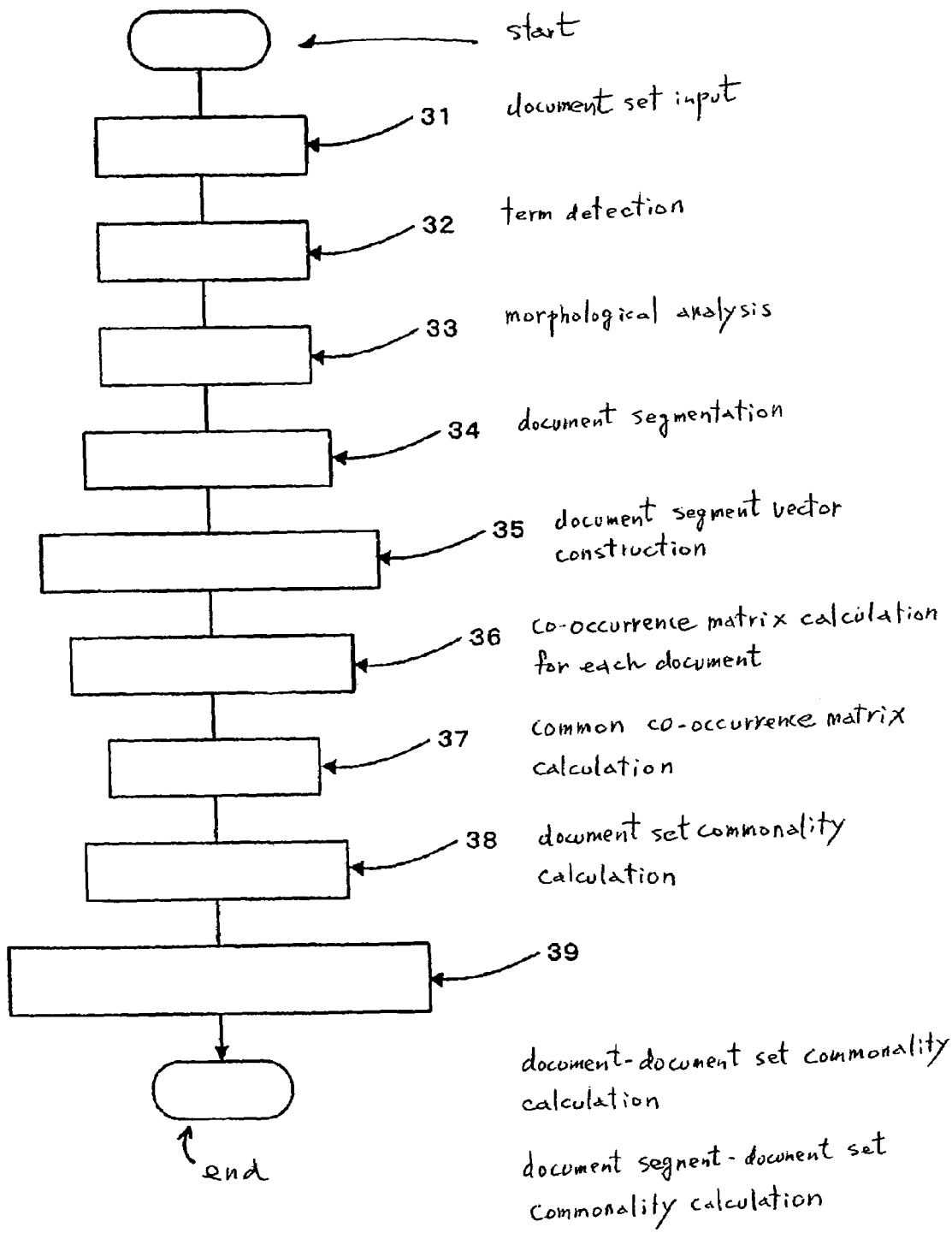
FIG. 3 is a flowchart of steps which proceed from a document set being supplied to the apparatus of FIG. 1 until the apparatus determines a document set commonality as well as a document (document segment)—document set commonality.

FIG. 3 is a flowchart of steps performed by the apparatus of FIG. 1 in accordance with a first embodiment of the present invention in which, for a given document set, a document set commonality indicating how the topics of individual documents are common is calculated, and the individual documents or individual document segments are scored in accordance with the degrees of closeness to a common topic. This method can be practiced in such a way that a program can be run on a general-purpose computer. Referring to FIG. 3, numeral 31 designates a document set input step; numeral 32 designates a term detection step; numeral 33 designates a morphological analysis step and numeral 34 designates a document segmentation step. Furthermore, numeral 35 designates a document segment vector construction step; numeral 36 designates a co-occurrence matrix calculation step for each document; numeral 37 designates a common co-occurrence matrix calculation step, numeral 38 designates a document set commonality calculation step and numeral 39 designates a document (document segment)—document set commonality calculation step. Now, the embodiment will be described by taking English documents as an example.

First, a document set to be handled is inputted at the document set input step 31. At the term detection step 32, words, formulas, a series of symbols, etc. are detected for each input document. Here, all of the words, the series of symbols, etc. shall be generically called "terms". In the case of the English writing, the notation method wherein the terms are spaced apart has been established, so that the detection of the terms is easy. Subsequently, the morphological analysis step 33 analyzes each input document morphologically, for example, tags the part-of-speech to the terms. At the next document segmentation step 34, each input document is divided into document segments. The document segment vector construction step 35 first determines the number of dimensions of a vector that is to be constructed from the terms occurring in the whole document, and the correspondence between the respective dimensions and the individual terms. On this occasion, the components of the vector need not correspond to all of the occurring terms, but the vector can be constructed from only the terms decided as, for example, nouns and verbs, by utilizing the results of the step 33 of the part-of-speech tagging. The step 35 subsequently constructs the document segment vector in which only the components corresponding to the terms occurring in the respective document segments assume a value "1", whereas the other components assume a value "0".

At the co-occurrence matrix calculation step 36 for each document, a co-occurrence matrix is created so as to reflect the occurrence frequencies of the terms and the co-occurrence frequencies between the terms in each document. Hereinafter, a sentence shall be assumed to be the document segment. Consider a case where the set of occurring terms is given by $\{w_1, \ldots, w_M\}$ and where the document set D consists of R documents. Further, the rth document $D_r$ is assumed to consist of $Y_r$ sentences, and the yth sentence and the sentence vector thereof are respectively indicated by $D_{ry}$ and $d_{ry}=(d_{ry1}, \ldots, d_{ryM})^T$. Here, the letter T denotes the transpose of a vector. The sentence vector $d_{ry}$ is a binary vector, and symbol $d_{rym}$ denotes the presence or absence of the mth term. Letting $S^r$ denote the co-occurrence matrix of the document $D_r$, $S^r$ is given by:

$$S^r = \sum_{y=1}^{Y_r} d_{ry} d_{ry}^T. \tag{1}$$

As seen from Eq. (1), the mn component of the co-occurrence matrix $S^r$ is given by:

$$S^r_{mn} = \sum_{y=1}^{Y_r} d_{rym} d_{ryn}.$$

Accordingly, $S^r_{mm}$ denotes the number of sentences in which the term m occurs in the document $D_r$, and $S^r_{mn}$ denotes the number of sentences in which the terms m and n co-occur. If the same term does not occur two or more times in the same sentence, the quantity $S^r_{mm}$ becomes the occurring frequency of the term m in the document $D_r$. At the common co-occurrence matrix calculation step 37, a co-occurrence matrix $S^C$ is evaluated for common vectors. This matrix shall be called the "common co-occurrence matrix". As stated before, the products of the corresponding components of the respective sentence vectors provide the values of the respective components of the common vector in the case where one sentence vector is derived from each document and where such sentence vectors are combined.

By way of example, the common vector between vectors (0, 1, 1, 0) and (1, 1, 0, 1) becomes (0, 1, 0, 0). The products among the corresponding components give the components of the common vector among three or more vectors. Here, for the sake of brevity, is a calculation of the co-occurrence matrix $S^C$ of $Y_1 \times Y_2 \times Y_3$ common sentence vectors that are obtained for all of the combinations of sentences among three documents $D_1$, $D_2$ and $D_3$. When the common sentence vector of the ith, jth and kth vectors $d_{1i}$, $d_{2j}$ and $d_{3k}$ of the respective documents $D_1$, $D_2$ and $D_3$ is denoted by $c^{ijk} = (c^{ijk}_m)$, the m-th component of the common sentence vector, $c^{ijk}_m$, is evaluated by $c^{ijk}_m = d_{1im} d_{2jm} d_{3km}$ as stated before. Each component of the common co-occurrence matrix $S^C$ is given by:

$$S^C_{mn} = \sum_{i=1}^{Y_1} \sum_{j=1}^{Y_2} \sum_{k=1}^{Y_3} c^{ijk}_m c^{ijk}_n$$
$$= \sum_{i=1}^{Y_1} \sum_{j=1}^{Y_2} \sum_{k=1}^{Y_3} d_{1im} d_{1in} d_{2jm} d_{2jn} d_{3km} d_{3kn}$$
$$= S^1_{mn} S^2_{mn} S^3_{mn}.$$

As a more generalized study, in the case of R documents, the k(r)th sentence is assumed to have been extracted from the document $D_r$ in the combinations of sentences, and the common vector is written as:

$$c^{k(1)k(2)\ldots k(R)} = (c^{k(1)k(2)\ldots k(R)}_1, \ldots, c^{k(1)k(2)\ldots k(R)}_M).$$

Then, $c^{k(1)\,k(2)\,\cdots\,k(R)}_m$ can be expressed as $d_{1k(1)m} d_{2k(2)m} \cdots d_{mk(m)m}$, so that the mn component of the matrix $S^C$ is given by the following equation:

$$S^C_{mn} = \sum_{k(1)=1}^{Y_1} \sum_{k(2)=1}^{Y_2} \cdots \sum_{k(R)=1}^{Y_R} c^{k(1)k(2)\ldots k(R)}_m c^{k(1)k(2)\ldots k(R)}_n \quad (2)$$
$$= \sum_{k(1)=1}^{Y_1} \sum_{k(2)=1}^{Y_2} \cdots \sum_{k(R)=1}^{Y_R} (d_{1k(1)m} d_{2k(2)m} \cdots d_{Rk(R)m})(d_{1k(1)n} d_{2k(2)n} \cdots d_{Rk(R)n})$$
$$= \sum_{l_i=1}^{Y_1} d_{1k(1)m} d_{1k(1)n} \sum_{j=1}^{Y_2} d_{2k(2)m} d_{2k(2)n} \cdots \sum_{k=1}^{Y_R} d_{Rk(R)m} d_{Rk(R)n}$$
$$= \prod_{r=1}^{R} S^r_{mn}.$$

Eq. (2) indicates that the components of the common co-occurrence matrix can be evaluated as the products of the corresponding components of the co-occurrence matrices of the respective documents, and the common co-occurrence matrix can be obtained without actually constructing the common vectors. As stated before, if the same term does not occur two or more times in the same sentence, the quantity $S^r_{mm}$ becomes the occurring frequency of the term m in the document $D_r$. It is considered that the same term will infrequently occur two or more times in the same sentence, so that the diagonal components of the common co-occurrence matrix $S^C$ can also be approximated by the products of the occurrence frequencies of the corresponding terms in the respective documents.

The document set commonality calculation step 38 calculates scores that indicate how the topics of the individual documents are common. As stated before, in the present invention, the document set commonality is evaluated on the basis of the sum or squared sum of the numbers of components having the value "1" in the individual common vectors, for all the common vectors. The document set commonality based on the sum shall be called the "linear model", and the document set commonality based on the squared sum shall be called the "quadratic model". First, the linear model will be explained. The sum of the numbers of components having the value "1" in the individual common vectors is denoted by $G_l(D_1, \ldots, D_R)$ and can be evaluated as:

$$G_l(D_1, \ldots, D_R) = \sum_{k(1)=1}^{Y_1} \sum_{k(2)=1}^{Y_2} \cdots \sum_{k(R)=1}^{Y_R} \sum_{m=1}^{M} c^{k(1)k(2)\ldots k(R)}_m \quad (3)$$
$$= \sum_{k(1)=1}^{Y_1} \sum_{k(2)=1}^{Y_2} \cdots \sum_{k(R)=1}^{Y_R} \sum_{m=1}^{M} (c^{k(1)k(2)\ldots k(R)}_m)^2$$
$$= \sum_{m=1}^{M} S^C_{mn}.$$

That is, the sum $G_l(D_1, \ldots, D_R)$ is expressed by the sum of the diagonal components of the common co-occurrence matrix. Eq. (3) represents the quantity of common information of the respective documents in the document set. Since, however, the value of the quantity of common information depends upon the lengths of the documents and the number of the documents, the above sum is normalized into a document set commonality $com_l(D)$ in order to avoid the influences of the factors, as follows:

$$com_l(D) = \quad (4)$$
$$\left[ \frac{G_l(D_1, \ldots, D_R)}{\sqrt[R]{G_l(D_1, \ldots, D_1) G_l(D_2, \ldots, D_2) \ldots G_l(D_R, \ldots, D_R)}} \right]^{1/(R-1)}$$
$$= \left[ \frac{\sum_{m=1}^{M} S^C_{mn}}{\sqrt[R]{\prod_{r=1}^{R} \sum_{m=1}^{M} (S^r_{mn})^R}} \right]^{1/(R-1)}.$$

The quadratic model will now be explained. The squared sum of the numbers of components having the value "1" the individual common vectors is denoted by $G_S(D_1, \ldots, D_R)$ and can be evaluated as the sum of the components of the common co-occurrence matrix, as follows:

$$G_s(D_1, \ldots, D_R) = \sum_{k(1)=1}^{Y_1} \sum_{k(2)=1}^{Y_2} \ldots \sum_{k(R)=1}^{Y_R} \quad (5)$$

$$\left(c_1^{k(1)k(2)\ldots k(R)} + \ldots + c_M^{k(1)k(2)\ldots k(R)}\right)^2$$

$$= \sum_{m=1}^{M} \sum_{n=1}^{M} \sum_{k(1)=1}^{Y_1} \sum_{k(2)=1}^{Y_2} \ldots \sum_{k(R)=1}^{Y_R}$$

$$\left(c_m^{k(1)k(2)\ldots k(R)} c_n^{k(1)k(2)\ldots k(R)}\right)$$

$$= \sum_{m=1}^{M} \sum_{n=1}^{M} S_{mn}^C.$$

A document set commonality $com_S(D)$ in the case of the quadratic model can be evaluated as follows:

$$com_s(D) = \quad (6)$$

$$\left[\frac{G_s(D_1, \ldots, D_R)}{\sqrt[R]{G_s(D_1, \ldots, D_1)G_s(D_2, \ldots, D_2)\ldots G_s(D_R, \ldots, D_R)}}\right]^{1/(R-1)}$$

$$= \left[\frac{\sum_{m=1}^{M}\sum_{n=1}^{M} S_{mn}^C}{\sqrt[R]{\prod_{r=1}^{R}\sum_{m=1}^{M}\sum_{n=1}^{M}(S_{mn}^r)^R}}\right]^{1/(R-1)}.$$

At the document (document segment)—document set commonality calculation step 39, a document—document set commonality is evaluated as a measure that indicates how close a document or sentence P to-be-handled is to the common topic of a document set D. There are two methods for the evaluation.

The first method is a method in which the document—document set commonality is evaluated as the document set commonality of a new document set obtained by adding the document P to the document set D. Letting $S^P$ denote the co-occurrence matrix of the document P, and letting $com_1(D+P)$ and $com_S(D+P)$ denote the document—document set commonalities in the cases of the linear model and the quadratic model, respectively, these quantities can be calculated as follows:

$$com_l(D+P) = \left[\frac{\sum_{m=1}^{M} S_{mm}^C S_{mm}^P}{\sqrt[R+1]{\left(\sum_{m=1}^{M}(S_{mm}^P)^{R+1}\right)\prod_{r=1}^{R}\sum_{m=1}^{M}(S_{mm}^r)^{R+1}}}\right]^{1/R} \quad (7)$$

$$com_s(D+P) = \left[\frac{\sum_{m=1}^{M}\sum_{n=1}^{M} S_{mn}^C S_{mn}^P}{\sqrt[R+1]{\left(\sum_{m=1}^{M}\sum_{n=1}^{M}(S_{mn}^P)^{R+1}\right)\prod_{r=1}^{R}\sum_{m=1}^{M}\sum_{n=1}^{M}(S_{mn}^r)^{R+1}}}\right]^{1/R}. \quad (8)$$

The second method is a method in which the document—document set commonality is defined by the similarity between the co-occurrence matrix evaluated from the document P and the common co-occurrence matrix. The two cases of a case of employing only the diagonal components of the co-occurrence matrix and a case of employing all the components thereof are thought out for the definition. When the document—document set commonalities in the former case and in the latter case are respectively denoted by $com_1(D, P)$ and $com_S(D, P)$, these quantities can be evaluated by:

$$com_1(D, P) = \frac{\sum_{m=1}^{M} S_{mm}^C S_{mm}^P}{\sqrt{\sum_{m=1}^{M}(S_{mm}^C)^2}\sqrt{\sum_{m=1}^{M}(S_{mm}^P)^2}} \quad (9)$$

$$com_s(D, P) = \frac{\sum_{m=1}^{M}\sum_{n=1}^{M} S_{mn}^C S_{mn}^P}{\sqrt{\sum_{m=1}^{M}\sum_{n=1}^{M}(S_{mn}^C)^2}\sqrt{\sum_{m=1}^{M}\sum_{n=1}^{M}(S_{mn}^P)^2}}. \quad (10)$$

In each of the first and second methods, the document—document set commonality is evaluated on the basis of the product-sum of all the components or diagonal components of the co-occurrence matrix of the document or sentence to-be-handled and the common co-occurrence matrix.

Figure 4:
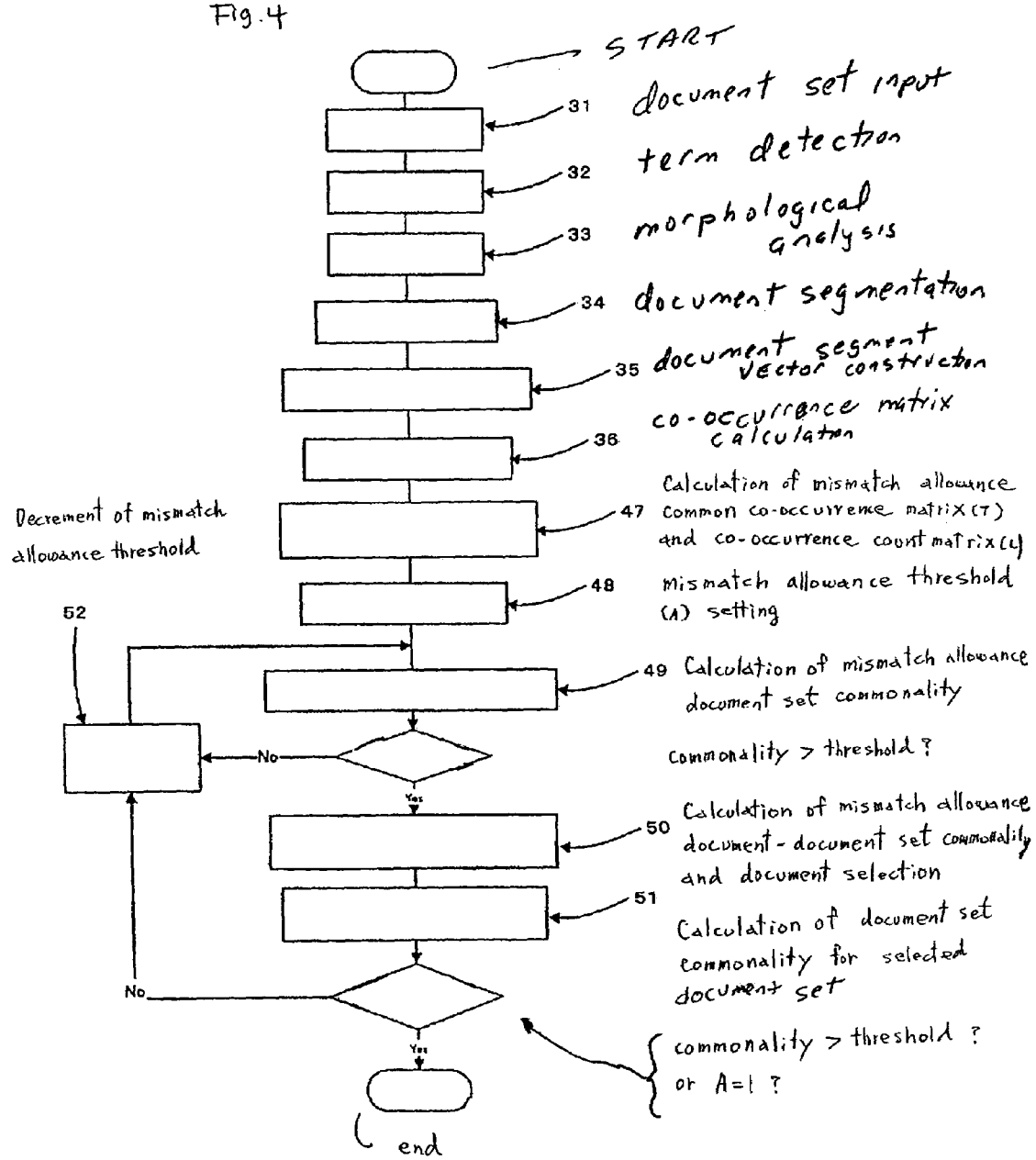
FIG. 4 is a flowchart of steps that proceed from a document set being supplied to the apparatus of FIG. 1 until the extraction of documents stating the most dominant topic.

FIG. 4 is a flowchart of a second embodiment in accordance with the present invention in which a group of documents having a common topic are extracted from within a document set whose topics are not necessarily common. This method of the invention can be practiced in such a way that a program in which the embodiment is incorporated can be run on a general-purpose computer. Referring to FIG. 4, numeral 31 designates a document set input step; numeral 32 designates a term detection step; numeral 33 designates a morphological analysis step and numeral 34 designates a document segmentation step. Furthermore, numeral 35 designates a document segment vector construction step; numeral 36 designates a co-occurrence matrix calculation step for each document. Numeral 47 designates a calculation of a mismatch allowance common co-occurrence matrix and a co-occurrence count matrix step; numeral 48 designates a mismatch allowance threshold setting step; numeral 49 designates a calculation of a mismatch allowance document set commonality step; numeral 50 designates a calculation of a mismatch allowance document—document set commonality and document selection step; numeral 51 designates a calculation of a document set commonality for a selected document set and validity evaluation step and numeral 52 designates a decrement of a mismatch allowance threshold step. Among the above-noted steps, steps 31-36 are the same steps as in FIG. 3, respectively.

Figure 2:
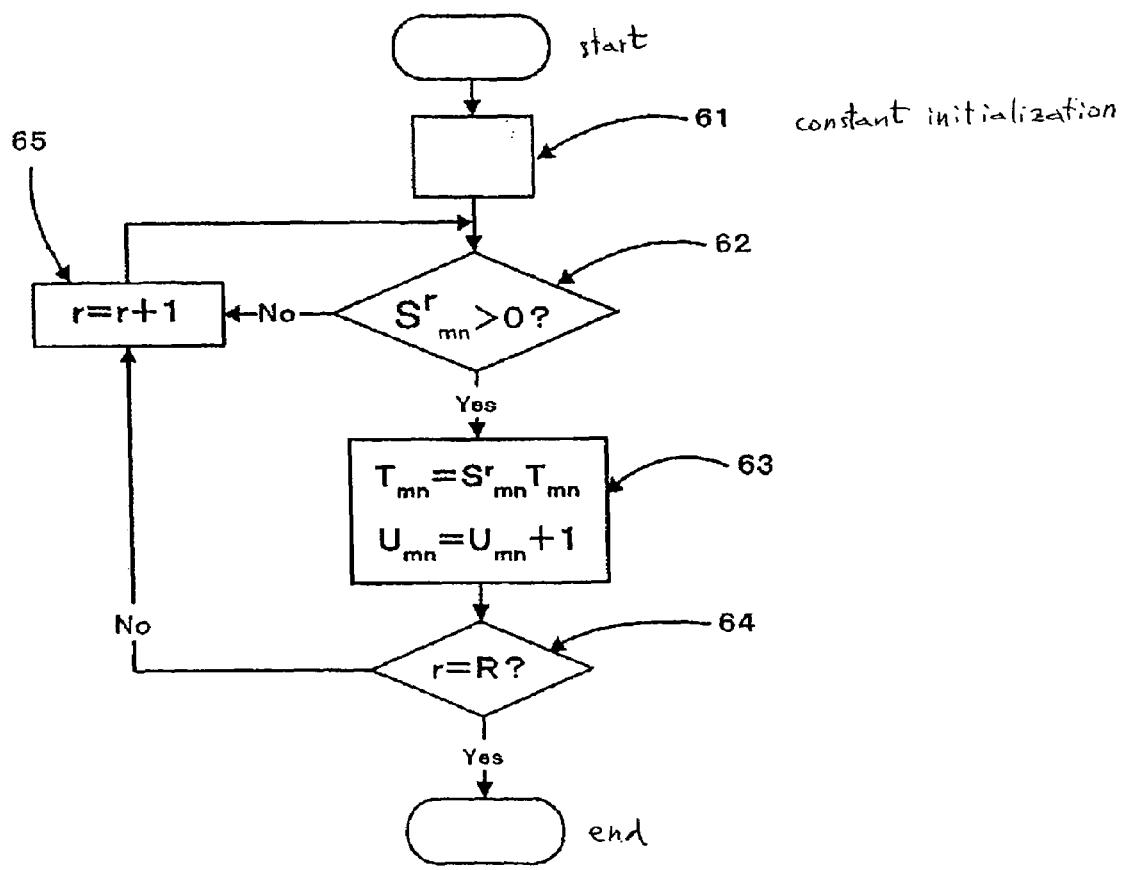
FIG. 2 is a flowchart of a method of creating a mismatch allowance common co-occurrence matrix in accordance with an aspect of the present invention.

As in the case of FIG. 3, a sentence is assumed to form a document segment. At the calculation of a mismatch allowance common co-occurrence matrix and a co-occurrence count matrix step, only those of the co-occurrence matrices of respective documents whose components have values not being zero are used in calculating the respective components of the mismatch allowance common co-occurrence matrix. Accordingly, insofar as a certain term or term co-occurrence infallibly appears in a document set D, the corresponding component of the mismatch allowance common co-occurrence matrix assumes a value different from zero. Such a matrix is expressed as T. Further, a matrix U for holding the number of times which each term or each term pair has occurred or co-occurred is evaluated at step 47. As shown in FIG. 2, the matrices T and U can be evaluated by the following steps:

Step 61; r=1 is input. All the components of the matrix T are assumed to be "1", and those of the matrix U are assumed to be "0".

Step 62; for $S^r_{mn}>0$, $$T_{mn}=S^r_{mn}T_{mn}$$

$$U_{mn}=U_{mn}+1 \qquad \text{(at step 63)}$$

Step 64; When r=R holds, the routine is ended, and when not, r=r+1 (at step 65), and the routine proceeds to step 62.

Referring back to FIG. 4, at the mismatch allowance threshold setting step 48, the initial value of a threshold A is set for the processing of the succeeding steps. The threshold A is used for validating only the terms or term co-occurrences which appear in, at least, A documents, in the mismatch allowance common co-occurrence matrix T. The initial value of the threshold A is the maximum value among the respective components of the co-occurrence count matrix U.

At step 49, a document set commonality of mismatch allowance type is calculated using the mismatch allowance common co-occurrence matrix in which the other components than the components corresponding to the terms or term co-occurrences appearing in the A or more documents have the value "0", and threshold processing is executed for judging whether or not the routine shifts to the processing of the step 50. Letting $T^A$ denote a mismatch allowance common co-occurrence matrix modified as described before, the mn component of the matrix $T^A$ is determined as follows:

$$T^A_{mn}=T_{mn} \text{ if } U_{mn}>=A,$$

$$T^A_{mn}=0 \text{ otherwise.}$$

In the case of FIG. 3, the components having the value "1" the common vector are only the components whose values are "1" in all the sentence vectors in the combinations of sentences. Here in the second embodiment, the common vector is determined so that the components which correspond to the terms appearing in the A or more documents can assume the value "1". The matrix $T^A$ is the common co-occurrence matrix that is evaluated from all the common vectors thus determined. The document set commonality employing the matrix $T^A$ instead of the matrix $S^C$ in Eq. (4) or Eq. (6) shall be called the "mismatch allowance document set commonality". Then, in case of the linear model, the commonality can be evaluated by:

$$com_l(D; T^A) = \left[ \frac{\sum_{m=1}^{M} T^A_{mn}}{\sqrt[R]{\prod_{r=1}^{R} \sum_{m=1}^{M} (S^r_{mm})^R}} \right]^{1/(R-1)} \qquad (11)$$

In case of the quadratic model, the commonality can be evaluated as:

$$com_s(D; T^A) = \left[ \frac{\sum_{m=1}^{M}\sum_{n=1}^{M} T^A_{mn}}{\sqrt[R]{\prod_{r=1}^{R} \sum_{m=1}^{M}\sum_{n=1}^{M} (S^r_{mn})^R}} \right]^{1/(R-1)} \qquad (12)$$

In these equations, $com_l(D;T^A)$ and $com_s(D;T^A)$ signify the document set commonalities that are respectively calculated by employing the matrix $T^A$ as the common co-occurrence matrix. Commonalities $com_l(D;T^R)$ and $com_s(D;T^R)$ are respectively equivalent to the commonalities $com_l(D)$ and $com_s(D)$.

Here, it is assumed that, in the document set D, documents of a number B smaller than the number R have common topics, whereas the others are not correlative to one another. On this occasion, if the value A is equal to or smaller than the value B, the sum of the components whose values are not zero in the matrix $T^A$ enlarges owing to the contribution of terms appearing in the B documents, so that the document set commonality of mismatch allowance type ought to become large. In contrast, when the value A lies between the value R and a value (B+1), any term happening to appear in the B or more documents is assumed to exhibit low frequencies in the respective documents. It is therefore considered that the sum of the non-zero components in the matrix $T^A$ will be small, so the mismatch allowance document set commonality will be small. At step 49, accordingly, the calculated mismatch allowance document set commonality is compared with the predetermined threshold, and on condition that the former is not less than the threshold, it is judged that the matrix $T^A$ will highly possibly be under the influence of the documents of the common topics. Then, the routine proceeds to step 50. On the other hand, if the calculated commonality is less than the threshold, the routine proceeds to step 52. The threshold in this case is experimentally determined beforehand.

At step 50, a document—document set commonality of mismatch allowance type is calculated for each document by employing the matrix $T^A$, so as to select any document as to which the value of the commonality exceeds a preset value. The mismatch allowance document—document set commonality employing the matrix $T^A$ can be obtained by replacing $S^C_{mn}$ with $T^A_{mn}$ in Eqs. (7) and (8) or Eqs. (9) and (10). In the case of, for example, Eqs. (9) and (10), when the document—document set commonalities for the document $D_r$ are respectively denoted by $com_l(D, D_r;T^A)$ in the linear model and $com_s(D, D_r;T^A)$ in the quadratic model, they can be evaluated as follows:

$$com_l(D, D_r; T^A) = \left[ \frac{\sum_{m=1}^{M} T^A_{mn} S^r_{mn}}{\sqrt{\sum_{m=1}^{M} (T^A_{mn})^2} \sqrt{\sum_{m=1}^{M} (S^r_{mn})^2}} \right]^{1/(R-1)} \qquad (13)$$

$$com_s(D, D_r; T^A) = \left[ \frac{\sum_{m=1}^{M}\sum_{n=1}^{M} T^A_{mn} S^r_{mn}}{\sqrt{\sum_{m=1}^{M}\sum_{n=1}^{M} (T^A_{mn})^2} \sqrt{\sum_{m=1}^{M}\sum_{n=1}^{M} (S^r_{mn})^2}} \right]^{1/(R-1)} \qquad (14)$$

The document selection selects each document as to which the commonality $com_l(D, D_r;T^A)$ in the case of adopting the linear model or the commonality $com_s(D, D_r;T^A)$ in the case of adopting the quadratic model exceeds the preset threshold. The threshold is experimentally determined beforehand.

At step 51, the document set commonality of each set of documents selected at step 50 is calculated, and threshold processing is executed in order to judge whether or not the topics are common as the document set. The document set commonality of the selected document set can be evaluated using Eq. (4) in the case of adopting the linear model, or Eq. (6) in the case of adopting the quadratic model. In a case where the document set commonality is greater than a threshold or where A=1 holds, the process is ended. On the other hand, in a case where the commonality is less than the threshold, the mismatch allowance threshold is decremented at step 52, followed by step 49, and the process is continued.

Here, the results of an experiment conforming to the embodiment of FIG. 4 will be demonstrated in order to explain the advantages of the present invention. Data used in the experiment were 21 news items taken out from a text categorizing corpus "Reuters-21578", and they were classified into three groups by topics. The contents of the groups were:

Group 1: 12 news items about the takeover of GenCorp as derived from a category "acquisition", Group 2: 6 news items about earthquakes in Ecuador as derived from a category "crude", Group 3: 3 news items about Mr. James Baker's speeches derived from a category "money-fx".

The purpose of the experiment was to extract the group 1 which has the largest number of documents, from among the 21 news items, and to further select three sentences that represent the common topic of the group 1 best. The number of sentences was 250, and the number of all terms was 1147. The maximum value in the components of the co-occurrence count matrix U at step 47 was not 12, but rather was 13. The reason was that a specified term appeared in the documents of both the groups 1 and 2. Therefore, the initial value of the threshold A was set at 13, and the iterative processing of steps 49→50→51→52→49 in FIG. 4 was executed. The mismatch allowance document set commonalities obtained at step 49 were 0.22 for A=13 in both the linear model and the quadratic model, and they were 0.39 for A=12 similarly. Since, in this case, the group 1 having the largest number of documents had 12 documents, the mismatch allowance document set commonality for A=12 was expected to exhibit a larger value, and the result was as expected. Since, however, the value of the commonality could not be said sufficiently small even in the case of A=13, the routine was caused to proceed to step 50 also for A=13. At step 50, the threshold for the document selection was set at 0.02 in both the linear model and the quadratic model. Then, 13 documents (9 documents of the group 1 and 3 documents of the group 2) were selected for A=13, while 12 documents (all belonging to the group 1) were selected for A=12. When the document set commonalities for the selected documents were evaluated, they were 0.29 and 0.33 in the linear model and quadratic model, respectively, in the case of A=13, and they were 0.85 and 0.90 similarly in the case of A=12. Accordingly, if the threshold at the block 51 is 0.5, the 12 documents selected for A=12 will be outputted as documents of uniform topics. As stated above, all these documents belong to the group 1.

The sentence—document set commonalities of individual sentences in the selected documents were evaluated using Eq. (9), and the three sentences of the largest commonality values were selected. The results are as indicated below.

First place: General Partners said it is asking GenCorp for its shareholder lists for help in disseminating the offer.

Second place: Earlier today, General Partners, owned by Wagner and Brown and AFG Industries Inc., launched a 100 dlr per share tender offer for GenCorp.

Third place: General Acquisition Co. said it was disappointed by GenCorp's response to its tender offer and asked how the company might give better value to shareholders.

Thus, it is understood that the most dominant topic in the document set concerns the takeover of GenCorp. Besides, when similar processing is executed after removing the selected documents from the document set, documents stating the second dominant topic (in this case, the group 2) can be extracted.

In this manner, according to the present invention, a group of documents sharing the most dominant topic in a document set can be taken out, and sentences closest to the common topic can be simultaneously presented to a user. Therefore, the efficiency of information acquisition by the user can be enhanced.

What is claimed is:

1. A method of evaluating a document set commonality for a document set including a plurality of documents each having one or more document segments, the commonality indicating a degree to which topics of the individual documents of the document set are common, the method comprising:
   (a) generating for each of the document segments, a document segment vector in which components corresponding to terms appearing in the document segment assume a value "1" (one), and the other components assume a value "0" (zero);
   (b) generating for each of the documents of the document set a co-occurrence matrix from the document segment vectors;
   (c) generating a common co-occurrence matrix having rows and columns in which components have values defined as products of values of components of the same rows and the same columns of the co-occurrence matrices; and
   (d) evaluating the document set commonality on the basis of a sum of either all the components or diagonal components of the common co-occurrence matrix.

2. A method of evaluating a document—document set commonality for a document set including a plurality of documents each having one or more document segments, the commonality indicating a degree to which a document to be evaluated within said document set is close to a topic common to the document set, the method comprising:
   (a) generating for each of the document segments, a document segment vector in which components corresponding to terms appearing in the document segment assume a value "1" (one), and the other components assume a value "0" (zero);
   (b) generating for each of the documents of the document set a co-occurrence matrix from the document segment vectors;
   (c) generating a common co-occurrence matrix having rows and columns in which components have values defined as products of values of components of the same rows and the same columns of the co-occurrence matrices; and
   (d) evaluating the document—document set commonality on the basis of
      either (i) a product-sum between (i1) all the components of the co-occurrence matrix for the document to be evaluated and (i2) all the components of the common co-occurrence matrix,
      or (ii) a product-sum between (ii1) the diagonal components of the co-occurrence matrix for the document to be evaluated and (ii2) the diagonal components of the common co-occurrence matrix.

3. A method of calculating a mismatch allowance document set commonality for a document set including a plurality of documents each having one or more document segments, the method comprising:
   (a) generating for each of the document segments, a document segment vector in which components corresponding to terms appearing in the document segment assume a value "1" (one), and the other components assume a value "0" (zero);

(b) generating for each of the documents of the document set a co-occurrence matrix from the document segment vectors;

(c) generating a mismatch allowance common co-occurrence matrix having rows and columns in which components have values defined as products of non-zero values of components of the same rows and the same columns of the co-occurrence matrices;

(d) checking if the components of the co-occurrence matrices have the value "0", and creating a co-occurrence count matrix for counting the number of the documents whose components are not "0"; and (e) correcting to become "0" any component of the mismatch allowance common co-occurrence matrix that corresponds to a component of the co-occurrence count matrix that has a value less than a predetermined threshold, and evaluating the mismatch allowance document set commonality on the basis of a sum of either all the components or diagonal components of the corrected mismatch allowance common co-occurrence matrix.

4. A method of extracting documents of common topic from within a document set including a plurality of documents each having one or more document segments, the method comprising:

(a) generating for each of the document segments, a document segment vector in which components corresponding to terms appearing in the document segment assume a value "1" (one), and the other components assume a value "0" (zero);

(b) generating for each of the documents of the document set a co-occurrence matrix from the document segment vectors;

(c) generating a mismatch allowance common co-occurrence matrix having rows and columns in which components have values defined as products of non-zero values of components of the same rows and the same columns of the co-occurrence matrices;

(d) checking if the components of the co-occurrence matrices have the value "0", and creating a co-occurrence count matrix for counting the number of the documents whose components are not "0";

(e) correcting to become "0" any component of the mismatch allowance common co-occurrence matrix that corresponds to a component of the co-occurrence count matrix that has a value less than a predetermined threshold, and evaluating a mismatch allowance document set commonality on the basis of a sum of either all the components or diagonal components of the corrected mismatch allowance common co-occurrence matrix;

(f) when the mismatch allowance document set commonality is not less than a certain threshold, evaluating for each of the documents a mismatch allowance type document—document set common commonality on the basis of
  either (i) a product-sum between (i1) all the components of the co-occurrence matrix for the document and (i2) all the components of the corrected mismatch allowance common co-occurrence matrix,
  or (ii) a product-sum between (ii1) the diagonal components of the co-occurrence matrix for the document and (ii2) the diagonal components of
  the corrected mismatch allowance common co-occurrence matrix; and (g) extracting the documents as to which the mismatch allowance type document—document set common commonality exceeds a predetermined threshold, as the documents of a common topic.

5. The method as defined in claim 1, further comprising letting M denote the number of sorts of the appearing terms, $D_r$ denote an rth document in a document set D consisting of R documents, $Y_r$ denote the number of document segments of the document $D_r$, and $d_{ry}=(d_{ry1}, \ldots, d_{ryM})^T$ denote a yth document segment vector of the document $D_r$, letter T indicating transposition of a vector, and determining the co-occurrence matrix $S^r$ of the document $D_r$ by:

$$S^r = \sum_{y=1}^{Y_r} d_{ry} d_{ry}^T.$$

6. The method as defined in claim 2, further comprising letting M denote the number of sorts of the appearing terms, $D_r$ denote an rth document in a document set D consisting of R documents, $Y_r$ denote the number of document segments of the document $D_r$, and $d_{ry}=(d_{dy1}, \ldots, d_{dyM})^T$ denote a yth document segment vector of the document $D_r$, letter T indicating transposition of a vector, and determining the co-occurrence matrix $S^r$ of the document $D_r$ by:

$$S^r = \sum_{y=1}^{Y_r} d_{ry} d_{ry}^T.$$

7. The method as defined in claim 3, further comprising letting M denote the number of sorts of the appearing terms, $D_r$ denote an rth document in a document set D consisting of R documents, $Y_r$ denote the number of document segments of the document $D_r$, and $d_{ry}=(d_{ry1}, \ldots, d_{ryM})^T$ denote a yth document segment vector of the document $D_r$, letter T indicating transposition of a vector, and determining the co-occurrence matrix $S^r$ of the document $D_r$ by:

$$S^r = \sum_{y=1}^{Y_r} d_{ry} d_{ry}^T.$$

8. The method as defined in claim 4, further comprising letting M denote the number of sorts of the appearing terms, $D_r$ denote an rth document in a document set D consisting of R documents, $Y_r$ denote the number of document segments of the document $D_r$, and $d_{ry}=(d_{ry1}, \ldots, d_{ryM})^T$ denote a yth document segment vector of the document $D_r$, letter T indicating transposition of a vector, and determining the co-occurrence matrix $S^r$ of the document $D_r$ by:

$$S^r = \sum_{y=1}^{Y_r} d_{ry} d_{ry}^T.$$

9. The method as defined in claim 5, further comprising determining an mn component $S^C_{mn}$ of a common co-occurrence matrix $S^C$ of a document set D by:

$$S^C_{mn} = \prod_{r=1}^{R} S^r_{mn}.$$

10. The method as defined in claim 6, further comprising determining an mn component $S^C_{mn}$ of a common co-occurrence matrix $S^C$ of a document set D by:

$$S^C_{mn} = \prod_{r=1}^{R} S^r_{mn}.$$

11. The method as defined in claim 7, further comprising determining an mn component $S^C_{mn}$ of a common co-occurrence matrix $S^C$ of a document set D by:

$$S^C_{mn} = \prod_{r=1}^{R} S^r_{mn}.$$

12. The method as defined in claim 8, further comprising determining an mn component $S^C_{mn}$ of a common co-occurrence matrix $S^C$ of a document set D by:

$$S^C_{mn} = \prod_{r=1}^{R} S^r_{mn}.$$

13. The method as defined in claim 1, further comprising each diagonal component of a common co-occurrence matrix $S^C$ of a document set D being approximated by a product of occurring frequencies of each corresponding term.

14. The method as defined in claim 2, further comprising each diagonal component of a common co-occurrence matrix $S^C$ of a document set D being approximated by a product of occurring frequencies of each corresponding term.

15. The method as defined in claim 3, further comprising each diagonal component of a common co-occurrence matrix $S^C$ of a document set D being approximated by a product of occurring frequencies of each corresponding term.

16. The method as defined in claim 4, further comprising each diagonal component of a common co-occurrence matrix $S^C$ of a document set D being approximated by a product of occurring frequencies of each corresponding term.

17. A program storage device, readable by a machine, tangibly embodying a program of instructions executable by the machine to perform the method of claim 1.

18. A program storage device, readable by a machine, tangibly embodying a program of instructions executable by the machine to perform the method of claim 2.

19. A program storage device, readable by a machine, tangibly embodying a program of instructions executable by the machine to perform the method of claim 3.

20. A program storage device, readable by a machine, tangibly embodying a program of instructions executable by the machine to perform the method of claim 4.

21. The program storage device as defined in claim 17, further comprising letting M denote the number of sorts of the appearing terms, $D_r$ denote an rth document in a document set D consisting of R documents, $Y_r$ denote the number of document segments of the document $D_r$, and $d_{ry}=(d_{ry1}, \ldots, d_{ryM})^T$ denote a yth document segment vector of the document $D_r$, letter T indicating transposition of a vector, determining the co-occurrence matrix $S^r$ of the document $D_r$ by:

$$S^r = \sum_{y=1}^{Y_r} d_{ry} d_{ry}^T.$$

22. The program storage device as defined in claim 18, further comprising letting M denote the number of sorts of the appearing terms, $D_r$ denote an rth document in a document set D consisting of R documents, $Y_r$ denote the number of document segments of the document $D_r$, and $d_{ry}=(d_{ry1}, \ldots, d_{ryM})^T$ denote a yth document segment vector of the document $D_r$, letter T indicating transposition of a vector, determining the co-occurrence matrix $S^r$ of the document $D_r$ by:

$$S^r = \sum_{y=1}^{Y_r} d_{ry} d_{ry}^T.$$

23. The program storage device as defined in claim 19, further comprising letting M denote the number of sorts of the occurring terms, $D_r$ denote an rth document in a document set D consisting of R documents, $Y_r$ denote the number of document segments of the document $D_r$, and $d_{ry}=(d_{ry1}, \ldots, d_{rmM})^T$ denote a yth document segment vector of the document $D_r$, letter T indicating transposition of a vector, determining the co-occurrence matrix $S^r$ of the document $D_r$ by:

$$S^r = \sum_{y=1}^{Y_r} d_{ry} d_{ry}^T.$$

24. The program storage device as defined in claim 20, further comprising letting M denote the number of sorts of the occurring terms, $D_r$ denote an rth document in a document set D consisting of R documents, $Y_r$ denote the number of document segments of the document $D_r$, and $d_{ry}=(d_{ry1}, \ldots, d_{ryM})^T$ denote a yth document segment vector of the document $D_r$, letter T indicating transposition of a vector, determining the co-occurrence matrix $S^r$ of the document $D_r$ by:

$$S^r = \sum_{y=1}^{Y_r} d_{ry} d_{ry}^T.$$

25. The program storage device as defined in claim 21, further comprising determining an mn component $S^C_{mn}$ of a common co-occurrence matrix $S^C$ of a document set D by:

$$S^C_{mn} = \prod_{r=1}^{R} S^r_{mn}.$$

26. The program storage device as defined in claim 22, further comprising determining an mn component $S^C_{mn}$ of a common co-occurrence matrix $S^C$ of a document set D by:

$$S^C_{mn} = \prod_{r=1}^{R} S^r_{mn}.$$

27. The program storage device as defined in claim 23, further comprising determining an mn component $S^C_{mn}$ of a common co-occurrence matrix $S^C$ of a document set D by:

$$S^C_{mn} = \prod_{r=1}^{R} S^r_{mn}.$$

28. The program storage device as defined in claim 24, further comprising determining an mn component $S^C_{mn}$ of a common co-occurrence matrix $S^C$ of a document set D by:

$$S^C_{mn} = \prod_{r=1}^{R} S^r_{mn}.$$

29. A computer system arranged to perform the method of claim 1.

30. A computer system arranged to perform the method of claim 2.

31. A computer system arranged to perform the method of claim 3.

32. A computer system arranged to perform the method of claim 4.

33. A method of evaluating a document segment—document set commonality for a document set including a plurality of documents each having one or more document segments, the commonality indicating a degree to which a document segment to be evaluated in a document within said document set is close to a topic common to the document set, the method comprising:

(a) generating for each of the document segments, a document segment vector in which components corresponding to terms appearing in the document segment assume a value "1" (one), and the other components assume a value "0" (zero);

(b) generating for each of the documents of the document set a co-occurrence matrix from the document segment vectors;

(c) generating a common co-occurrence matrix having rows and columns in which components have values defined as products of values of components of the same rows and the same columns of the co-occurrence matrices;

(d) evaluating a document set commonality, that indicates a degree to which topics of the individual documents of the document set are common, on the basis of a sum of either all the components or diagonal components of the common co-occurrence matrix; and (e) evaluating the document segment—document set commonality on the basis of the common co-occurrence matrix.

* * * * *